United States Patent
Kuopus

[11] Patent Number: 6,041,695
[45] Date of Patent: Mar. 28, 2000

[54] BBQ OVEN

[76] Inventor: Wilbert C. Kuopus, 327 Latigo Canyon Rd., Malibu, Calif. 90265-2708

[21] Appl. No.: 09/234,179

[22] Filed: Jan. 20, 1999

[51] Int. Cl.[7] .............................. A47J 37/04; A47J 37/07
[52] U.S. Cl. .......................... 99/428; 99/421 H; 99/446; 99/447; 99/448; 126/25 R
[58] Field of Search .............................. 99/444, 446, 447, 99/448, 450, 340, 427, 419, 421 H, 421 HH, 421 R, 421 HV; 126/25 R, 25 A, 25 AA, 41 B

[56] References Cited

U.S. PATENT DOCUMENTS

| | | | |
|---|---|---|---|
| 1,358,365 | 11/1920 | Matteis . | |
| 1,638,452 | 8/1927 | Panajiotaros et al. . | |
| 3,106,886 | 10/1963 | Layman | 99/421 H |
| 3,247,827 | 4/1966 | Cremer | 99/421 H |
| 3,296,957 | 1/1967 | Gagnon et al. | 99/421 HV |
| 3,333,539 | 8/1967 | Wilson | 99/339 |
| 3,343,527 | 9/1967 | Manteris | 126/25 R |
| 3,363,543 | 1/1968 | Roberts et al. | 99/421 HV |
| 3,372,636 | 3/1968 | Marasco | 99/427 |
| 3,683,791 | 8/1972 | Rast, Jr. | 99/340 |
| 3,742,838 | 7/1973 | Luschen et al. | 99/421 H X |
| 3,832,989 | 9/1974 | Belford | 99/421 HV X |
| 3,861,290 | 1/1975 | Ringo | 99/427 |
| 4,086,849 | 5/1978 | Simmons | 99/357 |
| 4,108,055 | 8/1978 | Simmons | 99/421 H |
| 4,184,420 | 1/1980 | Podaras et al. | 99/427 |
| 4,300,523 | 11/1981 | Robertson et al. | 126/21 A |
| 4,338,912 | 7/1982 | Gaskins | 126/25 R |
| 4,470,343 | 9/1984 | Didier | 99/427 |
| 4,643,163 | 2/1987 | Martinez | 126/41 A |
| 4,850,333 | 7/1989 | Dellrud et al. | 126/25 R |
| 4,867,051 | 9/1989 | Schalk | 99/443 C |
| 4,869,163 | 9/1989 | Haskins | 99/482 |
| 5,163,359 | 11/1992 | McLane, Sr. | 99/447 |
| 5,205,207 | 4/1993 | McGuire | 99/340 |
| 5,255,664 | 10/1993 | Gurliacci | 126/276 |
| 5,421,318 | 6/1995 | Unruh et al. | 126/25 A |
| 5,431,093 | 7/1995 | Dodgen | 99/427 |
| 5,456,163 | 10/1995 | Ceravolo | 99/446 |
| 5,473,977 | 12/1995 | Koether et al. | 99/421 |
| 5,515,774 | 5/1996 | Swisher et al. | 99/421 H X |
| 5,528,984 | 6/1996 | Saurwein | 99/482 |
| 5,562,022 | 10/1996 | Schmid et al. | 99/421 H |
| 5,570,627 | 11/1996 | Dahlstrom et al. | 99/427 |
| 5,660,101 | 8/1997 | Cirigliano | 99/395 |
| 5,704,278 | 1/1998 | Cross | 99/427 |
| 5,799,645 | 9/1998 | Strader et al. | 126/39 R |
| 5,836,295 | 11/1998 | Faraj | 126/25 R |

*Primary Examiner*—Milton Cano
*Attorney, Agent, or Firm*—Cislo & Thomas LLP

[57] ABSTRACT

An indirect heat barbecue oven and smoker which utilizes an elongate chamber for receiving combustibles so that smoke may be produced therein and wherein there is provided a rotating wheel with support arms, wherein each pair of support arms support an open mesh tray upon which foods or the like may be positioned and wherein the bottom of the oven forms a slanted floor of the oven and acts to receive and direct grease and fluids so that the same may be drained to the outside of the oven without contamination of the burners.

10 Claims, 5 Drawing Sheets

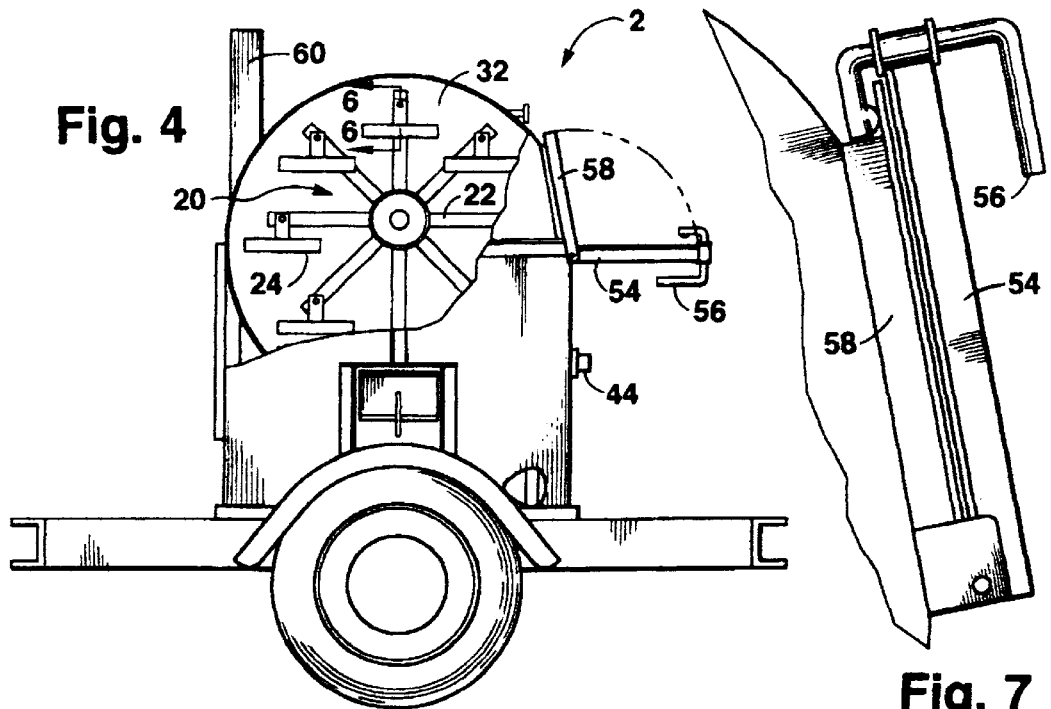
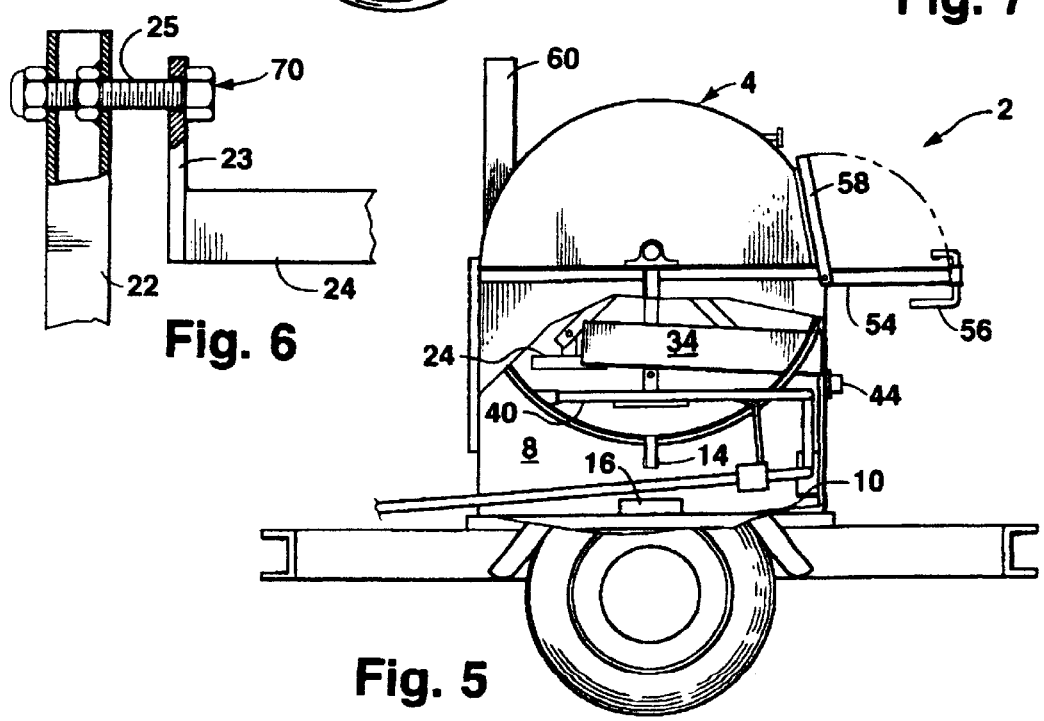

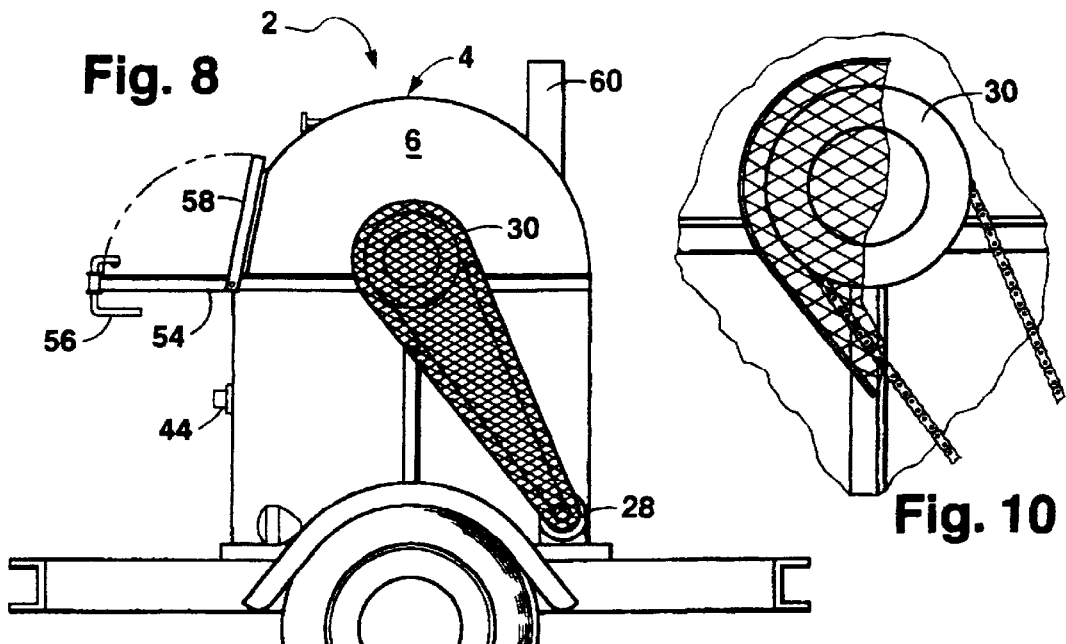
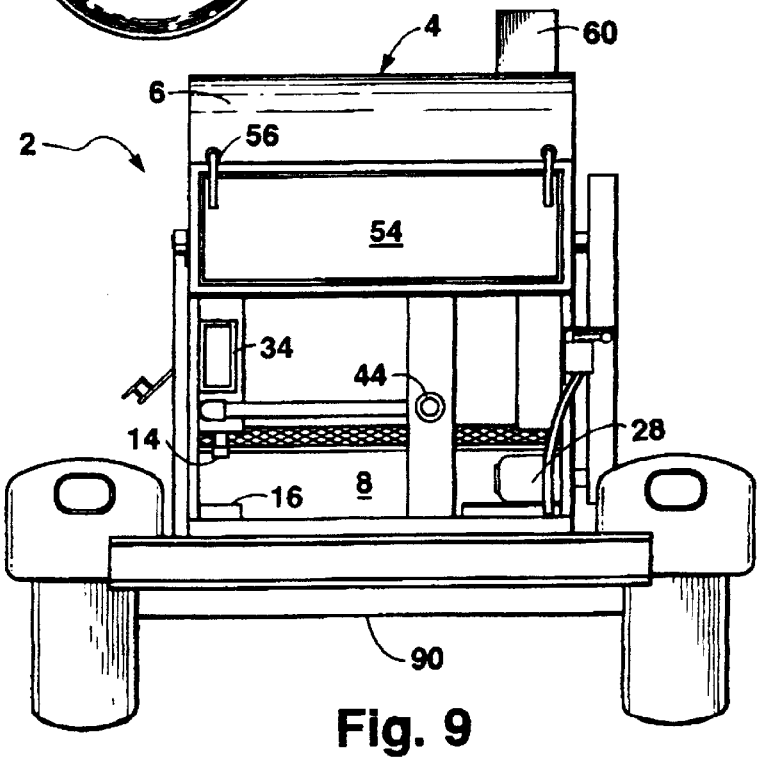

BBQ OVEN

SUMMARY OF THE INVENTION

This invention relates to an oven for roasting and barbecuing various foods and wherein there is an enclosure that forms an upper smoke and heat chamber and a lower fire chamber and wherein there is a rotating wheel member located within the enclosure for supporting pivoted shelves that hold the food thereon, so that the trays are rotated throughout the enclosure and still maintained in a level position. A unique elongate smoke chamber is provided to receive wood in the low combustion or non-burning state, but does allow for the charring of the combustible wood so as to form smoke which is driven towards the upper portion of the enclosure. The oven is further unique in the sense that a slanted floor connecting to an external collector pan is utilized and because of burner replacement, grease and other fluids emanating from the food do not drop directly onto the burners, thereby keeping the burners clean and wherein an access port is provided to drain off the grease and fluids that have been accumulated in the external collector. In a non-delimiting embodiment, the oven is mounted on wheels so as to make the device mobile for transportation from one place to another in an easy manner.

BACKGROUND OF THE INVENTION

1. Field of the Invention

This invention relates to the roasting and barbecuing of foods particularly meat in a manner so as to have the foods to be prepared placed on pivotably mounted shelves, which are supported from support arms from a wheel, which may be electrically or other power-wise driven so as to rotate the pivoted shelves throughout the oven enclosure and in particular, the upper portion of the oven where heat and smoke accumulates where smoking is desired. To that end, an elongate wood receiving chamber is provided, which has just enough air holes to allow charring, but to prevent actual full combustion of the wood to thereby provide the full effect of smoke for smoking purposes.

Additionally, heretofore, barbecue ovens of the type for barbecuing and roasting meats have had open trays that allow grease and other fluids from the foods being heated to drip directly onto the burner sometimes clogging the burners and otherwise creating an accumulation of grease and other contaminants directly on the burners, which is difficult to clean. This disability is cured in the instant barbecue oven by having a sloped wood receiving compartment placed above the burners and running the extent of the lower portion of the fire chamber so as to prevent the grease and the fluids from coming in contact with the burners per se. Thus, indirect heating is achieved. A sloped bottom floor and simple drain to the outside of the oven provides for removing grease and other accumulated fluids as the need arises. The door for loading the chamber is so situated with respect to the vent, that vents smoke and heated air from the interior, so as to allow complete smoking and cooking by providing an upper smoke and heat filled chamber that remains constant during the processing period.

The oven of the invention may be mobile in which event it is positioned on a chassis, which is wheeled, so that the oven may be easily transported from one location to another.

2. Description of the Related Art

The prior art is quit ubiquitous with respect to various barbecue ovens and chambers, both mobile and stationary, but none combine the unique combination of elements that is present in the instant device in order to provide in one instance an a transportable barbecue oven, which has an upper smoke chamber and a lower fire chamber wherein the lower fire chamber has a smoke generating compartment positioned above the burners to prevent accumulation of grease and other fluids on the burners directly and further, wherein there is provided in the upper smoke chamber a revolving supporting member having pivotably mounted trays thereon, which are adapted to hold the foods to be processed and wherein the smoke generating compartment is configured to receive elongate pieces of wood in a manner that allows for charring, but does not allow for complete combustion of the wood placed therein.

However, a prior search has been made and the most specific references found are hereinafter enumerated, but none detract from the patentability of the disclosed invention.

U.S. Pat. Nos. 5,431,093; 5,205,207; 5,704,278

These references are directed to rotary barbecue devices in which the trays are positioned on a wheel to be rotated about a horizontal axis extending along the central longitudinal axis of the grill chamber. For example, in the '278 Patent, a shelf assembly 16 is mounted in a rotatable manner within the main chamber 12 between lateral sidewalls thereof, whereby the shelf assembly 16 is mounted in a rotatable manner on the main oven body enclosure 12 for rotating the shelf assembly 16. A gas burner system 20 is within the main chamber 12 below the shelf assembly 16. The air within the chamber 12 circulates with the help of the forced air circulation system 24.

In the '207 Patent, the heat chamber includes linear gas burners which heat the space in the chamber and also edibles mounted on a longitudinal spit which rotates about the top of the housing.

U.S. Pat. Nos. 5,163,359; 4,869,163; 5,528,984

These Patents are directed to gas heated grills and smoking units which can sit inside the gas grills. For example, the '359 Patent describes a cooking apparatus comprising a pair of burners offset from a grill so that grease from the cooking food drips into a sump rather than onto the burners. A series of slats above the burners direct and distribute the heated air to the grill, each slat intercepting a different portion of the heated air. A drip ledge between the burners and the grill helps to channel the grease into the sump and away from the burners. A smoker intercepts some of the heated air and circulates it among wood chips, and returns smoke to the housing interior. The smoker 94 is in the form of a small chamber seated to rear wall 92 of housing 12 with a flange 160 and positioned just below drip ledge 136.

U.S. Pat. No. 4,867,051

This reference is directed to a barbecue grill apparatus which has a container with curved walls. A shaft is rotatably attached to a top portion of the container and a plurality of arms extend radially outwardly therefrom. The arms each have a grill attached thereto in such a manner that when the shaft is rotated, each of the new grills will maintain a horizontal orientation. A source of heat is disposed in the container, to one side of the lowest portion of the bottom of the container, so that grease dripping into the container will not accumulate directly over the flame to thereby prevent burning of such grease. In the '343 Patent, a plurality of food baskets are secured to the shaft and extend radially from the shaft toward and away from the combustion chamber. A spacing is provided between drawers with the fuel, which defines a grease drip space. The basket arrangement provides a high cooking capacity construction that eliminates turning over and basting the food, that minimizes the flaming of grease drippings. In the '645 Patent, the grill unit includes a drip pan for collecting grease, a drain opening in the drip pan, and a conduit leading from the drain opening to a grease collector.

U.S. Pat. Nos. 4,086,849; 4,108,055

These references are directed to mobile broiler apparatuses which include a trailer frame having road engaging wheels thereon and a hinge for connection to a vehicle. In the '055 Patent, rotatable food supporting devices are mounted on the support bracket in spaced relation from the bottom wall of the broiler chamber and vertically spaced above a controllable heat generator positioned in the spacing between the rotatable food supporting devices and the bottom wall of the chamber for cooking food.

DISCLOSURE OF THE INVENTION

This invention relates an oven for roasting and barbecuing comprising the combination of an enclosure forming an upper smoke and heat chamber and a lower fire chamber with the lower fire chamber containing gas fueled burners and having an elongate wood receiving member, with a plurality of apertures therein and being adapted to receive wood therein in a non-combustionable fashion but still to allow charring thereof, superpositioned over the burners. The oven has a rotating member operatively supported within the enclosure and carrying a plurality of pivoted, open mesh shelves adapted to hold foods thereon and having a slanted bottom floor to catch grease and fluids which communicates to the outside to a grease and fluid container supported outside the lower fire chamber.

In a more specific embodiment of the invention, the invention is directed to an oven for roasting and barbecuing, which has the attributes described above, but further, is mounted on a wheeled chassis so that the oven barbecue may be easily transported from one place to another.

It is an important object of the invention to provide an oven for roasting and barbecuing having specific attributes which none of the prior devices in the prior art provide.

It is another important object to provide an oven for roasting and barbecuing wherein there is an enclosure forming an upper smoke and heat chamber and a lower fire chamber wherein a rotating supporting member therebetween has pivotably mounted shelves and an exterior catch pan is provided to catch grease and other fluids emanating from the foods being processed to keep them out of contact with the burner.

It is another important object of the invention to provide a roasting and barbecue oven which has supported in the interior thereof a wheel member having radiating support arms, each pair of which supports, in pivotable fashion, an open mesh-like tray upon which is supported meats and the like.

It is another important object of the invention to provide a roasting and barbecuing oven which has an elongated, wood receiving member or compartment which is open to the outside by which to place wood therein so as to permit smoke to be accumulated within the upper portion of the roasting and barbecuing oven, which elongate member is at an elevated position with respect to its outside opening.

It is still another more important object of the invention to provide a mobile, gas fired oven for roasting and barbecuing which has a wood smoke producing compartment positioned above the gas burners so as to prevent grease and fluid from coming in contact therewith and which oven has a slanted bottom floor and opening communicating to the outside of the oven so that fluid and grease may be drained therefrom.

These and other objects of the invention will become apparent from referring to the hereinafter following commentary or specification taken in conjunction with the drawings.

BRIEF DESCRIPTION OF THE DRAWINGS

FIG. 4 is a side view of the oven depicted in FIG. 1 with a partial broken away section that shows more details of construction;

FIG. 5 is a view similar to FIG. 4 showing even more details of construction;

FIG. 6 is an enlarged, fragmented view taken along the line 6—6 of FIG. 4 showing how the individual shelves are mounted to the support arms of the rotating member;

FIG. 7 is an enlarged, fragmented view showing more details of construction of the door latch means of the barbecue oven door;

FIGS. 8, 9 and 10 are additional views of the barbecue oven of the invention showing more details thereof;

DESCRIPTION OF THE PREFERRED EMBODIMENT(S)

Figure 1:
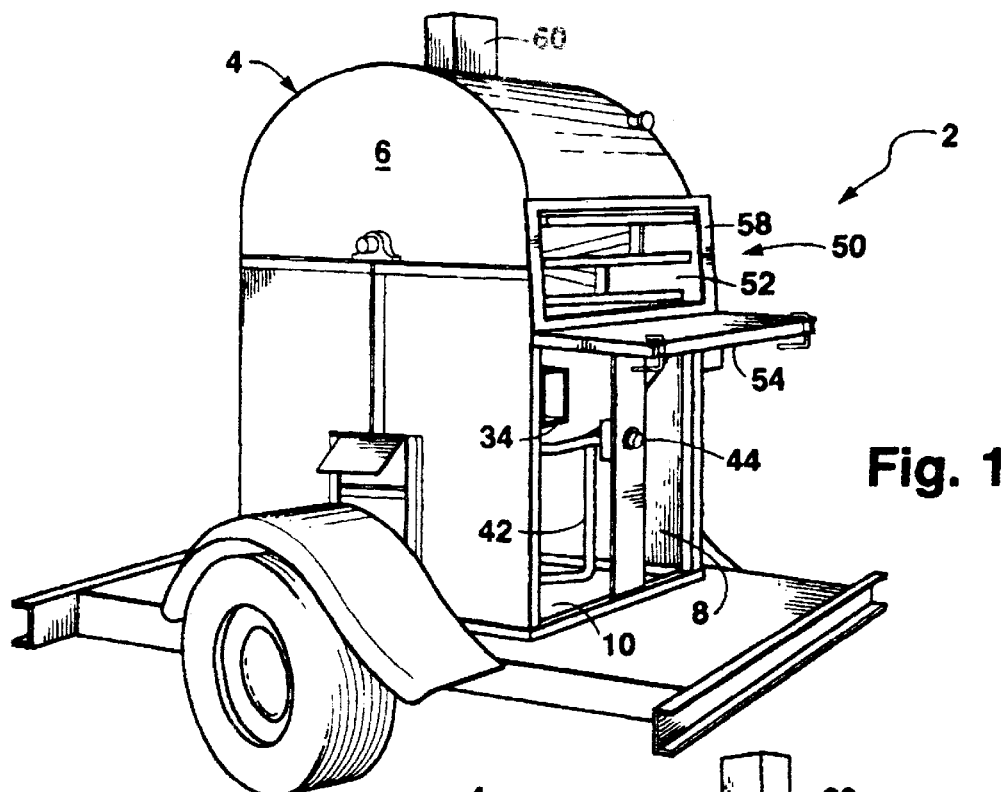
FIG. 1 is a frontal, perspective view of the barbecue oven of this invention.
Figure 2:
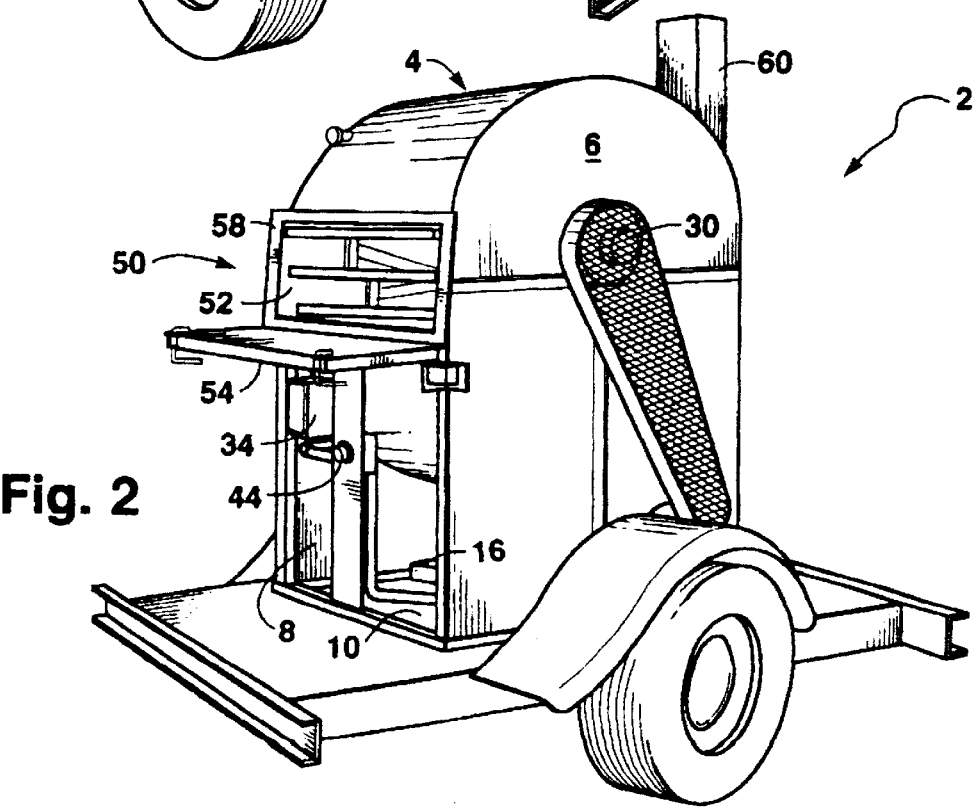
FIG. 2 is a perspective view of the barbecue oven shown in FIG. 1 from a different perspective thereof.

The detailed description set forth below in connection with the appended drawings is intended as a description of presently preferred embodiments of the invention and is not intended to represent the only forms in which the present invention may be constructed and/or utilized. The description sets forth specific elements of structure, but is not to be delimited to those specific illustrations. For example, while the illustrations show the barbecue oven of the invention being mounted on a wheel chassis, the barbecue oven of the invention, employing the concepts as will become more fully apparent, may be utilized in a stationary barbecue oven and those of ordinary skill in the art will recognize such modifications and changes as may be necessary in utilizing the barbecue oven of the invention should that stationary relationship be desirable.

Indeed, the appended claims are intended to encompass various modifications and changes, all of which will make themselves readily apparent to those of ordinary skill in the to art all without departing from the spirit and scope of the invention.

While the present invention has been described with regards to particular embodiments, it should be recognized that additional variations of the present invention may be devised without departing from the inventive concept.

Referring to the drawings wherein like references designate like elements throughout, it will be noted that the barbecue oven 2 of the invention in this particular instance comprises an enclosure 4 having an upper smoker and heat portion 6 and a lower burner portion 8 and having a bottom floor 10 which is somewhat inclined from the portion of the chamber 4 furthest from the burners 12 so that grease and other drippings that fall onto bottom floor 10 are directed towards a drain or exit port 14 which communicates to a lower grease receiving receptacle 16. The floor need only be inclined a small amount (about ½ inch) so that it slopes towards the drain port 14 which has a closure not shown, but which may be open during the barbecuing process to allow grease and other fluids, as will be seen, to accumulate on the bottom floor 10 and allowed to be drained therefrom.

Supported within the oven 4 and more specifically, in the upper portion 6 is rotatable wheel member 20 comprising spaced and opposed support arms 22 each carrying an open mesh tray 24 in pivoted relationship so that the trays 24 stay in the horizontal, level position during operation and when the wheel assembly 20 rotates. Upright bracket 23 of tray 24 allows for attendant to support arm 22. Sleeve 25 is provided for adjustment of trays 24. Wheel assembly 20 is driven by external motor 28 by means of pulley and chain mechanism 30 to slowly rotate wheel assembly 20 through 360° in continuous fashion, as will be described.

The wheel assembly 20 is positioned somewhat higher than the center of the upper oven portion 4 so as to allow the trays 24 carrying for example, meat and the like, to pass through a concentrated smoke and heat upper portion 32 of oven portion 6.

It will be noted that an elongate wood receiving chamber or compartment 34 having spaced apertures 36 with outside door 78 is provided to receive wood by which smoke and the like is generated. Charring as opposed to full combustion is achieved by reason of the limited number of apertures 36 provided to thereby control the amount of oxygen provided to wood contained within the compartment 34. The compartment 34 has its forward end closest to the door opening lower than the reward section by about 15° so that smoke generated by the slightly combustible wood within compartment 34 moves rearwardly towards and into the back portion of barbecue oven 2.

Operatively and structurally supported below wood smoke generating compartment 34 are two parallel burners 40 connected through suitable gas conduit 42 which has the usual gas controls and regulator 44 by which gas being passed into the burners 40 may be regulated. The apertures provided in the gas burner 40 are of the usual type and it will be noted that the placement of the burners 40 beneath the elongate compartment 34 isolates the burners from fat and other drippings emanating from the food or meat products carried on the trays 24 during the barbecuing process. Thus, indirect heating is obtained and drippings and the like are never in direct contact with the burners 40.

The front 50 of barbecue oven 2 is provided with a opening 52 with hinged door 54 so that access to the interior of oven 2 may be obtained. Door 54 is secured through the front portion 50 of oven 2 by a simple L-shaped latch member 56 engaging flange 58 provided around opening 52.

It will be noted that the upper most portion of opening 52 is below a line drawn therefrom to the lower most interior opening of vent 60, thereby allowing for an accumulation of heat and smoke in section 32 of upper oven portion 6, as best seen in FIG. 4 of the drawings.

The lower most portion of the vent 60 is about ½ inch or so above the top of the opening 52 which prevents smoke and heat bellowing out towards the operator of the device and because of the gas burner placement, it is clear that indirect heating and smoking of food carried in the pivoted trays 24 is achieved.

Referring to the Figures and more particularly FIG. 6, it is seen that the arms 22 of rotating member 20 pivotally support each of the trays 24 by simple bolt and nut mechanism such as 70, best seen in FIG. 6 of the drawings.

Figure 12:
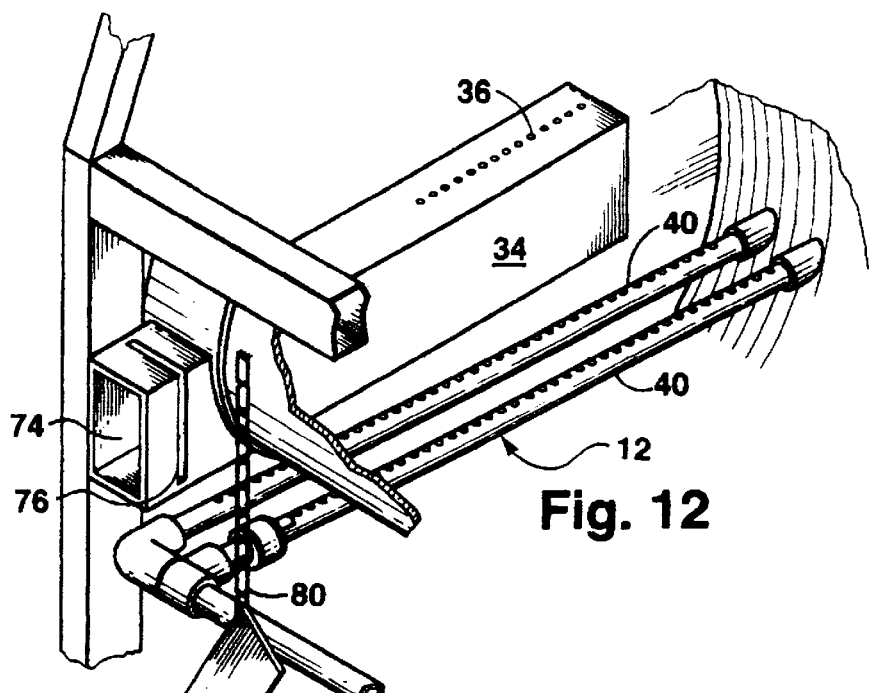
FIG. 12 is a fragmented view showing the burners and elongate wood receiving member for producing smoke in the barbecue oven of the invention.
Figure 11:
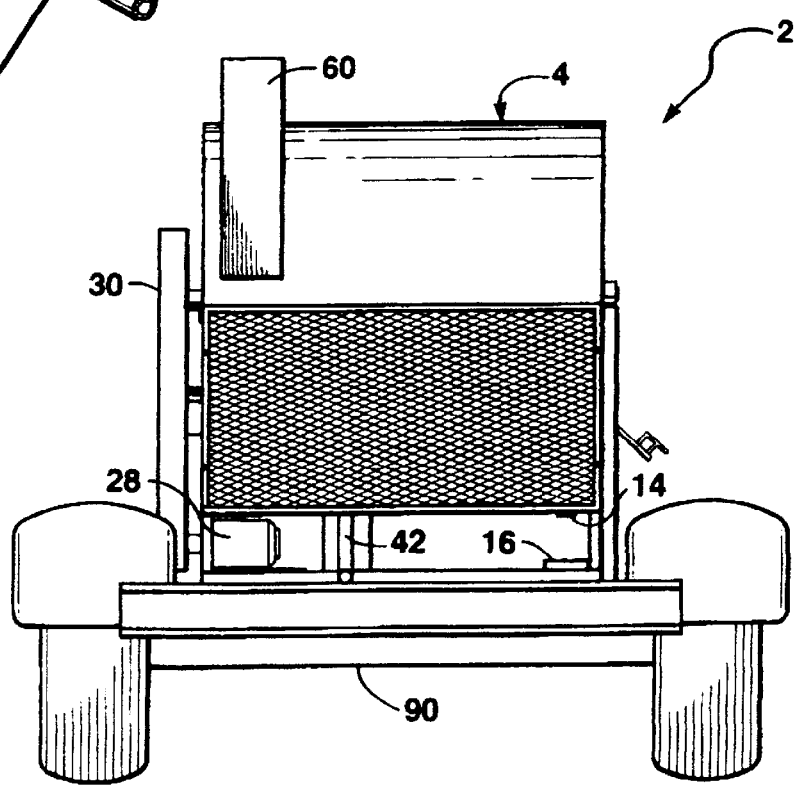
FIG. 11 is a back view of the barbecue oven of the invention.

As can be seen in FIG. 12 for better clarity, the elongate compartment 34 for receiving wood has an opening 74 exterior of the barbecue oven 2 so that additional wood may be placed thereinto and a slot 76 is provided at the exiting terminus of compartment 34 so as to receive plate door 78 suspended from a chain 80, for example to the exterior of barbecue oven 2 so that the door 78 may be simply placed in the slot 76 to close off and limit oxygen as well as conserving heat relative to elongate compartment 34 and the interior 6 of barbecue oven 2.

Though not required to accomplish the attributes of the invention, in this particular instance, the barbecue oven 2 is mounted on a wheeled chassis 90 so that the barbecue device 2 may be easily transported from one location to another in a facile manner.

The fuel supply that may be furnished to the burners 40 may be a stationary supply source as may be found from any utility hook up in which event adequate hose connection is provided, or the fuel source may come from propane tanks, each of which are not shown.

The power source for the electrical motor 28 driving the rotating wheel structure 20 may be any electrical source the connections and specifics of which are not shown and form no part of the invention. Also as seen in FIG. 1, a bottom, small, side draft and clean out door provides closure to the access to the interior of the barbecue oven 2. Thus, the degree of openness of the door allows for more or less air entry for combustion purposes.

The various component parts making up the oven of the invention should be readily apparent to those of ordinary skill in the art. Structural steel parts may be welded or bolted together and all such aspects, including materials, thickness, etc. from no part of the invention.

EXAMPLE

Figure 3:
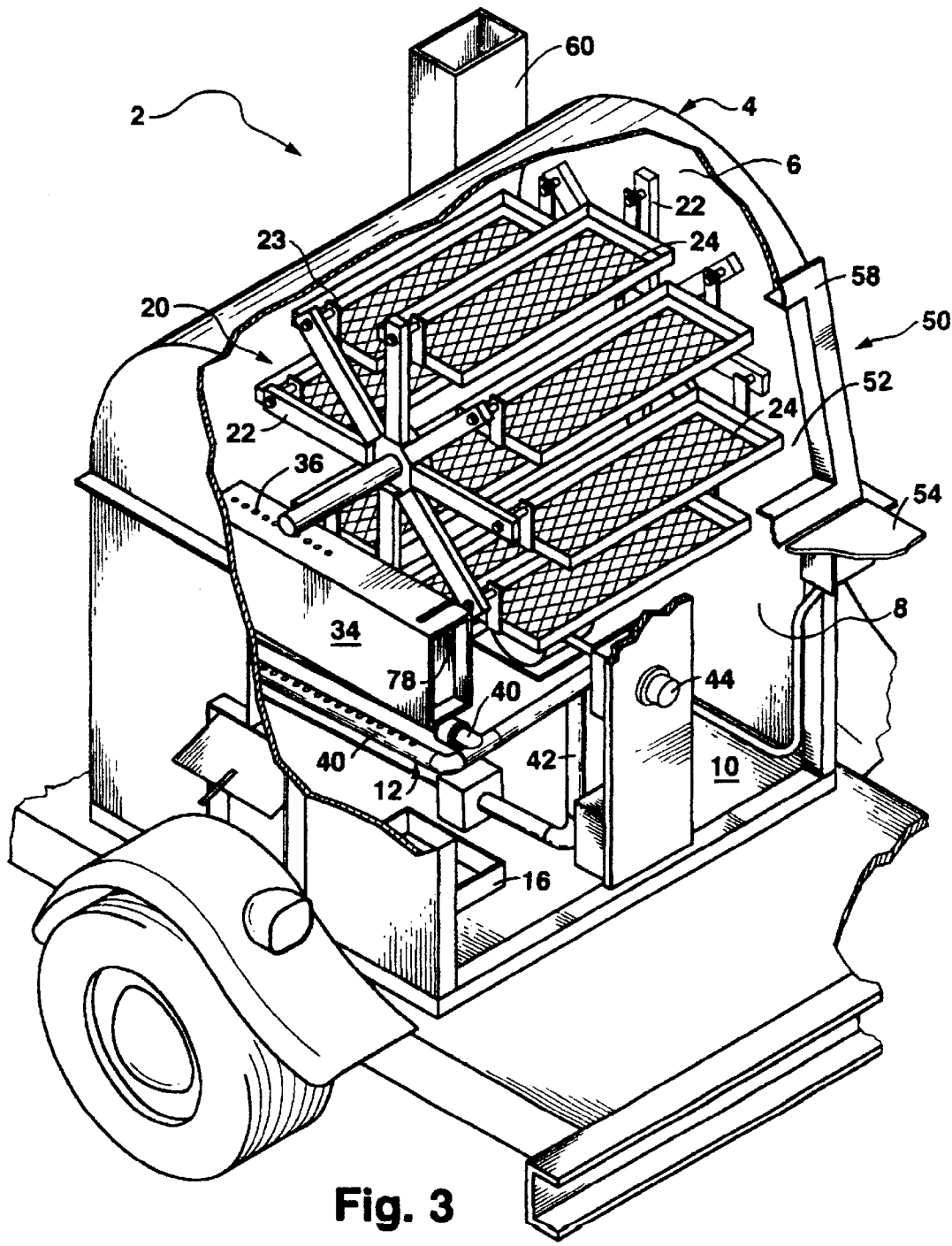
FIG. 3 is a perspective view of the barbecue oven being shown mounted on a wheeled chassis and being partially broken away to show more details of construction hereof.

A barbecue oven 2 of the type shown in FIG. 3 has been constructed having the following dimensions:

Overall Height: 5 feet

BBQ Unit Height: 4 feet

Width: 4 feet

Depth: 4 feet

Material: Hot Roll Steel

Thickness: 10 gauge

Other parameters included an electrical motor having an outside electrical source a ⅛ H-horsepower gear reduction motor is utilized to drive the wheel upon which the pivoted trays are positioned. The oven is securely placed in combination with a wheeled chassis to make movement of the oven to various locations for barbecuing easily obtainable.

Wood such as a 2×4 hickory piece of timber approximately 18" inches long is positioned in the smoke producing compartment. Meat and other foods are placed on the open mesh trays and gas from an outside source is turned on to provide fuel which is subsequently ignited by conventional means to begin to build up heat within the confines of the barbecue oven. The electric motor is energized to rotate the wheeled assembly to bring the open mesh trays into alignment with the open front door to permit loading of the trays with food stuffs after which the door is closed and barbecuing commences and continues until the food, depending upon what is being cooked, is readied after which the front door is opened, the trays are rotated to permit removal of cooked food stuffs therefrom and the gas burners shut off, all during which time a cap to the grease drain has been left off so that grease and other accumulated fluids may collect in a grease box located on the under side of the oven.

Thus, there has been disclosed a barbecue oven having several unique features including having an elongate smoke box to receive wood to be partially conbusted or charred in order to form smoke and wherein heat is obtained in the barbecue oven by means of indirect heat. Grease and other fluids are not permitted to impinge upon the burners and further, accumulated fluids and grease are dropped to the oven floor which is slopped towards a clean out plug and wherein the elongate compartment is slopped towards the front of the barbecue to permit more efficient smoke generation and further, wherein an upper portion of the barbecue by reason of its structural dimensions permits the formation on an upper a smoke and heat area through which the meats and other food stuffs, on rotating pivotally supported shelving, is passed.

While the barbecue oven invention has been specifically disclosed with respect to specific elements of construction, those of ordinary skill in the art will recognize various modifications and alterations all of which will not depart from the spirit of the appended claims.

What is claimed is:

1. An oven for roasting and barbecuing comprising the combination of:

an enclosure forming an upper smoke chamber and a lower fire chamber, said lower fire chamber containing a gas fuel burner with said upper smoke chamber having an elongate wood receiving member having a plurality of apertures therein for receiving wood therein in a slow combustible fashion and to overlie said gas fuel burner;

a rotating member operatively supported within said enclosure and carrying a plurality of pivotally mounted shelves for holding foods thereon; and said enclosure having a slanted bottom floor communicating to an outside grease and fluid collector and wherein said burners are isolated from grease and other drippings emanating from the food to be roasted and barbecued.

2. The oven in accordance with claim 1 wherein said rotating member comprises opposed support arms each of which pair carries an open mesh tray in pivotal relationship therewith so that said open mush tray is maintained in a horizontal position.

3. The oven in accordance with claim 2 wherein said enclosure has an opening with a door by which entry therein is obtained and wherein the enclosure has a vent opening which vent opening is above the upper most periphery of said opening so as to form a stagnant and stationary area within the upper portion of said enclosure to allow continuous smoking and heating of food stuff carried on said open mesh trays.

4. The oven in accordance with claim 3 wherein said elongate smoke chamber is elevated about 15° at the opening thereof relative to the rear terminus thereof.

5. The oven in accordance with claim 4 wherein the relative spacing of said door opening and said vent is such as to permit the formation of a stagnant area in the upper confines of said enclosure to permit and subject the food stuffs to heat and smoke during the roasting and barbecuing process.

6. The oven in accordance with claim 5 wherein said enclosure is mobile and is mounted on a wheeled chassis and which includes an electrically driven motor operatively mounted to said rotating member to drive same through 360° of rotation.

7. The oven in accordance with claim 6 wherein said rotating member has a shaft operatively and rotatively secured to the said enclosure and extending outwardly therefrom to be driven by a sprocket and chain assembly.

8. The oven in accordance with claim 7 wherein shaft is mounted higher than the center of said upper smoke chamber.

9. The oven in accordance with claim 5 wherein beneath said bottom floor of said enclosure is mounted, a grease trap for collecting grease and other fluids emanating from said food stuffs and a communication is provided communicating said bottom floor and said grease trap.

10. An over for roasting and barbecuing comprising the combination of:

an enclosure forming an upper smoke chamber and a lower fire chamber, said lower fire chamber containing a gas fuel burner with said upper smoke chamber having an elongate wood receiving member having open forward receiving end and a rearward end and having a plurality of apertures therein for receiving wood therein in a slow combustion fashion and to overlie said gas fuel burner, the rearward end of said wood receiving member being raised at least 15° relative to said forward end;

a rotating member operatively supported above the center of said upper smoke chamber within said enclosure and carrying a plurality of pivotally mounted open mesh shelves for holding foods thereon; and said enclosure having a central opening to allow access to said open mesh shelves and having a slanted bottom floor communicating to an outside grease and fluid collector, a vent stack communicating to the interior of said enclosure and having its lower most opening above a line drawn between the upper perimeter of said opening and the lower opening of said vent stack and wherein said burners are isolated from grease and other drippings emanating from the food to be roasted and barbecued.

* * * * *